United States Patent
Su et al.

(10) Patent No.: US 10,425,547 B2
(45) Date of Patent: Sep. 24, 2019

(54) SYSTEM AND METHOD FOR SELECTING AND IMPLEMENTING ONE OR MORE USER CUSTOMIZED MFP INTERFACES

(71) Applicant: Toshiba TEC Kabushiki Kaisha, Shinagawa-ku (JP)

(72) Inventors: William Su, Riverside, CA (US); Jia Zhang, Irvine, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/172,105

(22) Filed: Oct. 26, 2018

(65) Prior Publication Data

US 2019/0068801 A1 Feb. 28, 2019

Related U.S. Application Data

(63) Continuation-in-part of application No. 15/966,955, filed on Apr. 30, 2018, now Pat. No. 10,110,768, and a continuation-in-part of application No. 15/862,886, filed on Jan. 5, 2018, now Pat. No. 10,027,839, which is a continuation of application No. 15/455,348, filed on Mar. 10, 2017, now Pat. No. 9,912,826, application No. 16/172,105, filed on Oct. 26, 2018, (Continued)

(51) Int. Cl.
*H04N 1/00* (2006.01)
*H04N 1/32* (2006.01)

(52) U.S. Cl.
CPC ....... *H04N 1/0097* (2013.01); *H04N 1/00411* (2013.01); *H04N 1/00424* (2013.01); *H04N 1/00506* (2013.01); *H04N 1/00511* (2013.01); *H04N 1/32122* (2013.01); *H04N 2201/0094* (2013.01); *H04N 2201/3211* (2013.01)

(58) Field of Classification Search
CPC ............ H04N 1/0097; H04N 1/00511; H04N 1/00411; H04N 1/32122; H04N 1/00424; H04N 1/00506; H04N 2201/0094; H04N 2201/3211
USPC ....................................... 358/1.15
See application file for complete search history.

(56) References Cited

U.S. PATENT DOCUMENTS 8,578,160 B2 11/2013 Applin et al.
9,357,088 B2 * 5/2016 Kuroyanagi ....... H04N 1/00453
(Continued)

*Primary Examiner* — Allen H Nguyen
(74) *Attorney, Agent, or Firm* — Ulmer & Berne LLP

(57) ABSTRACT

A system and method for customizing a multifunction peripheral user interface includes a multifunction peripheral with a document processing controller including a processor and memory. The memory stores identified electronic customization groups, each comprised of electronic files. The memory also stores device customization data sets, each data set corresponding to document processing in the multifunction peripheral. A print engine and a scan engine are operational by instructions issued from the controller. The processor generates indicia on a display identifying each of the customization groups and receives a user selection of one or more customization group. A customizations menu listing available customizations from the selections is displayed along with a document processing options menu including corresponding device customization data sets. Selectable user interface packages, where at least one of the interface packages includes a document processing options menu, are stored in the memory.

20 Claims, 11 Drawing Sheets

Related U.S. Application Data which is a continuation-in-part of application No. 15/455,785, filed on Mar. 10, 2017, now Pat. No. 10,097,718, application No. 16/172,105, filed on Oct. 26, 2018, which is a continuation-in-part of application No. 15/680,720, filed on Aug. 18, 2017, now Pat. No. 10,129,421, and a continuation-in-part of application No. 15/455,348, filed on Mar. 10, 2017, now Pat. No. 9,912,826, and a continuation-in-part of application No. 15/455,785, filed on Mar. 10, 2017, now Pat. No. 10,097,718.

(60) Provisional application No. 62/712,600, filed on Jul. 31, 2018, provisional application No. 62/491,553, filed on Apr. 28, 2017, provisional application No. 62/334,634, filed on May 11, 2016, provisional application No. 62/360,581, filed on Jul. 11, 2016.

(56) References Cited

U.S. PATENT DOCUMENTS

| | | | |
|---|---|---|---|
| 2008/0091800 A1 | 4/2008 | Sorrentino et al. | |
| 2011/0199638 A1* | 8/2011 | Ogino ................ | H04N 1/00384 358/1.15 |
| 2016/0072972 A1* | 3/2016 | Akuzawa ........... | H04N 1/00413 358/1.13 |
| 2017/0013145 A1 | 1/2017 | Hong | |

* cited by examiner

TopAccess

| Device | Job Status | Logs | Registration | Counter | User Management | Administration | e-Filing |
| --- | --- | --- | --- | --- | --- | --- | --- |
| Setup | Security | Maintenance | Registration | AirPrint | Application | | Logout |

Application
Application List | Settings

Copy App   [Save] [Cancel]

☑ Automatically Send Application Diagnostic Data
Allow the application to send diagnostic information to Toshiba Registration cloud server improves the quality of apps
The diagnostic data does not contain personally identifiable information Scan Quality ☐ Show options to the user — 404
● 200 DPI
○ 300 DPI
○ 400 DPI Page Scanning ☐ Show options to the user — 416
☐ Scan both sides of pages
☐ Remove Blank Pages Color Mode ☐ Show options to the user — 408
● Color
○ Gray Scale
○ Black Only Finishing ☐ Show options to the user — 420
☐ Staple
☐ Hole Punch File Type ☐ Show options to the user — 412
● PDF
○ TIFF
○ JPG Scan Confirmation — 424
☑ Print Confirmation Receipt Send Confirmation E-mail to
☐ Logged in User
☐ Other E-mail Addresses
[Enter up to 5 comma separated e-mail addresses]

Install Software |   | Top | Help |   ©2016 TOSHIBA TEC CORPORATION All Rights Reserved.

SYSTEM AND METHOD FOR SELECTING AND IMPLEMENTING ONE OR MORE USER CUSTOMIZED MFP INTERFACES

CROSS-REFERENCE TO RELATED APPLICATIONS

This application claims the benefit of U.S. Provisional Application No. 62/712,600 filed Jul. 31, 2018, which is incorporated by reference in its entirety. This application is also a continuation-in-part of U.S. application Ser. No. 15/966,955, filed Apr. 30, 2018, which claims the benefit of U.S. Patent Application Ser. No. 62/491,553 filed Apr. 28, 2017, which is incorporated by reference in its entirety. This application is also a continuation-in-part of U.S. application Ser. No. 15/862,886, filed Jan. 5, 2018 (now U.S. Pat. No. 10,027,839), which is a continuation of U.S. application Ser. No. 15/455,348, filed Mar. 10, 2017 (now U.S. Pat. No. 9,912,826), which claims the benefit of U.S. Provisional Application No. 62/334,634, filed May 11, 2016, all of which are incorporated herein by reference. This application is also a continuation-in-part of U.S. application Ser. No. 15/455,785, filed Mar. 10, 2017 (now U.S. Pat. No. 10,097,718), which claims the benefit of U.S. Provisional Application No. 62/360,581, filed Jul. 11, 2016, both of which are incorporated herein by reference. This application is also a continuation-in-part of U.S. application Ser. No. 15/680,720 filed Aug. 18, 2017, which claims the benefit of U.S. Patent Application Ser. No. 62/491,553, filed Apr. 28, 2017, and is also a continuation-in-part of U.S. application Ser. No. 15/455,348, filed Mar. 10, 2017 (now U.S. Pat. No. 9,912,826) which claims the benefit of U.S. Provisional Application No. 62/334,634, filed May 11, 2016, and is also a continuation-in-part of U.S. application Ser. No. 15/455,785, filed Mar. 10, 2017 (now U.S. Pat. No. 10,097,718) which claims the benefit of U.S. Provisional Application No. 62/360,581, filed Jul. 11, 2016, all of which are incorporated herein by reference.

TECHNICAL FIELD

This application relates generally to multifunction peripherals. The application relates more particularly to selection and implementation of one or more customized user interface packages on multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

MFPs are typically provided with a fixed set of functions that are available to device end users. In addition to printing, copying, scanning and e-mailing, the device may add further options. Copying or printing may involve hole punching or stapling. Printing may be in black and white, or in color. Scanning may be to an image file or to a text-inclusive file via optical character recognition. These, and other options, are typically selectable by device users via a user interface, such as a touchscreen display integrated into an MFP.

BRIEF DESCRIPTION OF THE DRAWINGS

Various embodiments will become better understood with regard to the following description, appended claims and accompanying drawings wherein:

FIG. 4 is a first screenshot of an example embodiment for administrative customization of applications;

FIG. 5 is a second screenshot of an example embodiment for administrative customization of applications;

FIG. 6 is a third screenshot of an example embodiment for administrative customization;

DETAILED DESCRIPTION

Figure 1:
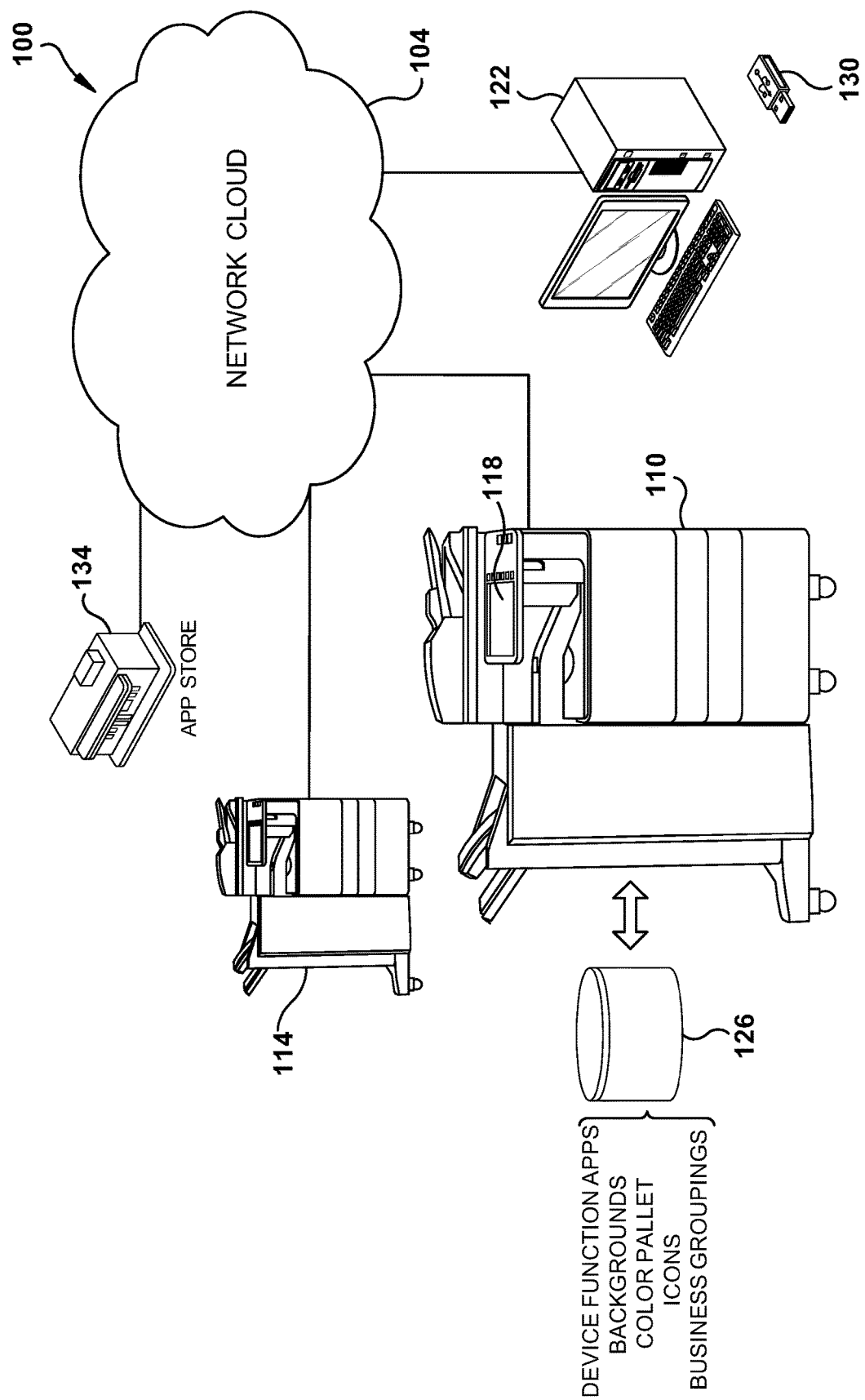
FIG. 1 is an example embodiment of an MFP network.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiments disclosed herein, a system and method for customizing a multifunction peripheral user interface includes a multifunction peripheral with a document processing controller including a processor and memory. The memory stores identified electronic customization groups, each comprised of electronic files. The memory also stores device customization data sets, each data set corresponding to document processing in the multifunction peripheral. A print engine and a scan engine are operational by instructions issued from the controller. The processor generates indicia on a display identifying each of the customization groups and receives a user selection of one or more customization group. A customizations menu listing available customizations from the selections is displayed along with a document processing options menu including corresponding device customization data sets. Selectable user interface packages, where at least one of the interface packages includes a document processing options menu, are stored in the memory.

MFPs are increasingly powerful and capable devices. With such increases comes increasing complexity of device-user interaction. There may be a substantial number of menus generated on the MFP display which may be hierarchical with many possible layers. Users must learn to navigate these menus and controls. A typical MFP user interface design will have most frequently used functions at a top or high level menu. Less popular device functions can be difficult to find, as well as time consuming to locate.

Some users are required to navigate complex menu structures to access less popular functions that they use frequently.

Certain users or businesses may have particular and frequent need for certain MFP functions which are not needed by others. In these situations, device users may be frequently required to spend considerable time at an MFP user interface to complete their document processing tasks. In businesses with devices that differ from one another, there may be different steps that need to be taken with one device than those required to taken to complete the same job on another device available to them.

In addition to the forgoing, various businesses often have a set of forms that they use regularly. By way of example, an auto dealership may have forms for vehicle sale, vehicle lease, vehicle rental or vehicle purchase. They may also have forms for credit applications, license plate orders, insurance information, etc. An auto salesperson may have their own forms folder and grab a master of a needed form for photocopying for a customer. This requires additional steps for the salesperson. It also provides room for error or inconsistencies since one salesperson may have a different or outdated version of a form in their forms folder. Additionally, certain forms may need to be completed in duplicate, requiring two copies requiring the salesperson to recall that or make a trip back to the MFP. In addition, certain customer data may be sensitive, and even subject to privacy protection under the law, such as personal information that may appear in a credit application.

Other professions will have their own MFP device needs that are markedly different than those of other businesses. The legal profession, for example, may need forms for subpoenas, complaints, proof-of-service and invoices. The medical profession may need forms for patient consent, writing of prescriptions, patient information questionnaires or patient insurance information. The legal profession and the medical profession provide examples of businesses that need to maintain very high levels of confidentiality. Failure to do so may comprise a lawyer's attorney-client privilege. Failure to do so in the medical profession may result in a violation of confidentiality requirements of the U.S. Federal Health Information Portability and Accountability Act (HIPAA), leaving a potential for criminal or civil liability for breaches. Use of improper or outdated forms can result in losses in legal proceedings or patient harm in medical situations. Of course, these can also result in malpractice litigation.

Example embodiments herein provide a system and method for customization of MFPs by end users or system administrators. Functions specific to a particular user or business can be customized to be more readily accessible on MFP interfaces which may be on a user interface of a device itself, communicated by a networked device via a web interface, or built in whole or in part within a driver, such as a printer driver, that is called on a user device. Certain functions may be made unavailable to device users, such as color printing or color copying to avoid toner or ink expenses. By way of further example, an administrator may also implement mandatory device functions, such as by automatically encrypting all e-mails. The administrator may also provide for a customized interface with the company color scheme and company logo. The administrator may also tailor menu hierarchy to have functions of specific or frequent needs placed in a more readily accessible location. As a further benefit, the MFP stores electronic documents, such as forms or templates, for uniform use by employees. In addition to the forgoing, the subject application includes example embodiments wherein a business obtains an MFP device with pre-stored libraries of forms, controls, menus or the like, which are generically in use by other businesses of the same type.

By way of example, the MFP suitably arrives to a business pre-populated with settings, menus, or electronic documents specific to different businesses. For example, there may be a default administrator setup choice for "Legal Profession," which includes legal forms, legal documents, brief templates and blank time slips. It may also include address information for various courts or governmental agencies. Thus, all or some of the law firm's needs may be set up immediately. The administrator may then add or replace electronic documents, such as by uploading or scanning from paper. They may also add needed device functions not appearing in the standard legal setup. They may also add or modify menu structures, as well as customize colors, fonts, resolution, etc. They may also import their firm logo so that it appears on the user interface. This is suitably done via a portable data device, such as USB drive, CD or DVD, via a network connection or by scanning a paper document bearing the logo. The administrator may also export and replicate this interface on other MFP devices in use by the business.

While customization of an MFP interface is extremely useful, a typical MFP has a single user interface that is presented to all device users. While this may be acceptable in many instances, in other instances it may be problematic. By way of example, an MFP may be shared by different users or different groups of users with diverse needs. A single MFP may be shared by an accounting department and a sales department. Generating a customized user interface geared toward one group can impede device usage by the other. Generation and implementation of multiple or alternative user interfaces can also be difficult to accomplish and lead to significant device problems. By way of further example, a particular, customized user interface may have been created, but is not currently in use by the device, and it may have been a while since it was used. An MFP configuration may have changed, such as adding functionality such as a hole puncher or a stapler, or removing functionality previously present. A device's firmware or other software may have been updated or otherwise altered. A user interface is tightly integrated with device hardware and software, and a change to either can render the user interface inoperable in whole or in part, and may even subject the device to damage.

First, a user interface customization system will be described. In accordance with the subject application, FIG. 1 illustrates an example embodiment of an MFP network 100 that includes one or more MFPs, illustrated by MFPs 110 and 114. Network 104 is suitably comprised of a local area network (LAN) or a wide area network (WAN) which may comprise the global Internet, or any suitable combination thereof. A system administrator or other user can access MFP control via any suitable user interface, such as an integrated user interface 118 or remotely, such as via workstation 122. While workstation 122 is illustrated as a wired computer, it will be appreciated that any suitable data device, including smartphones, tables, notebook computers, or the like, with network connections that are wireless or wired, may be used. Remote device interfacing is suitably done by accessing an MFP via a network address, such as an internet protocol or IP address. Access may be directly through a web interface, and may include tools such as TOPACCESS from Toshiba America Business Solutions, Inc.

MFP 110 is provided with data storage 126 for electronically storing data corresponding to available device function applications, display backgrounds, color pallets, icons, business groupings, etc.

Additional applications that are available to control MFPs may also be added. They may be physically transported to the MFP via a portable data device such as flash drive 130 or any other suitable data transfer mechanism including BLUETOOTH, near field communication (NFC), optical, CD, DVD, wireless or wired network, etc. Applications may also be purchased from an application store, such as App Store 134, suitably via network cloud 104.

Figure 2:
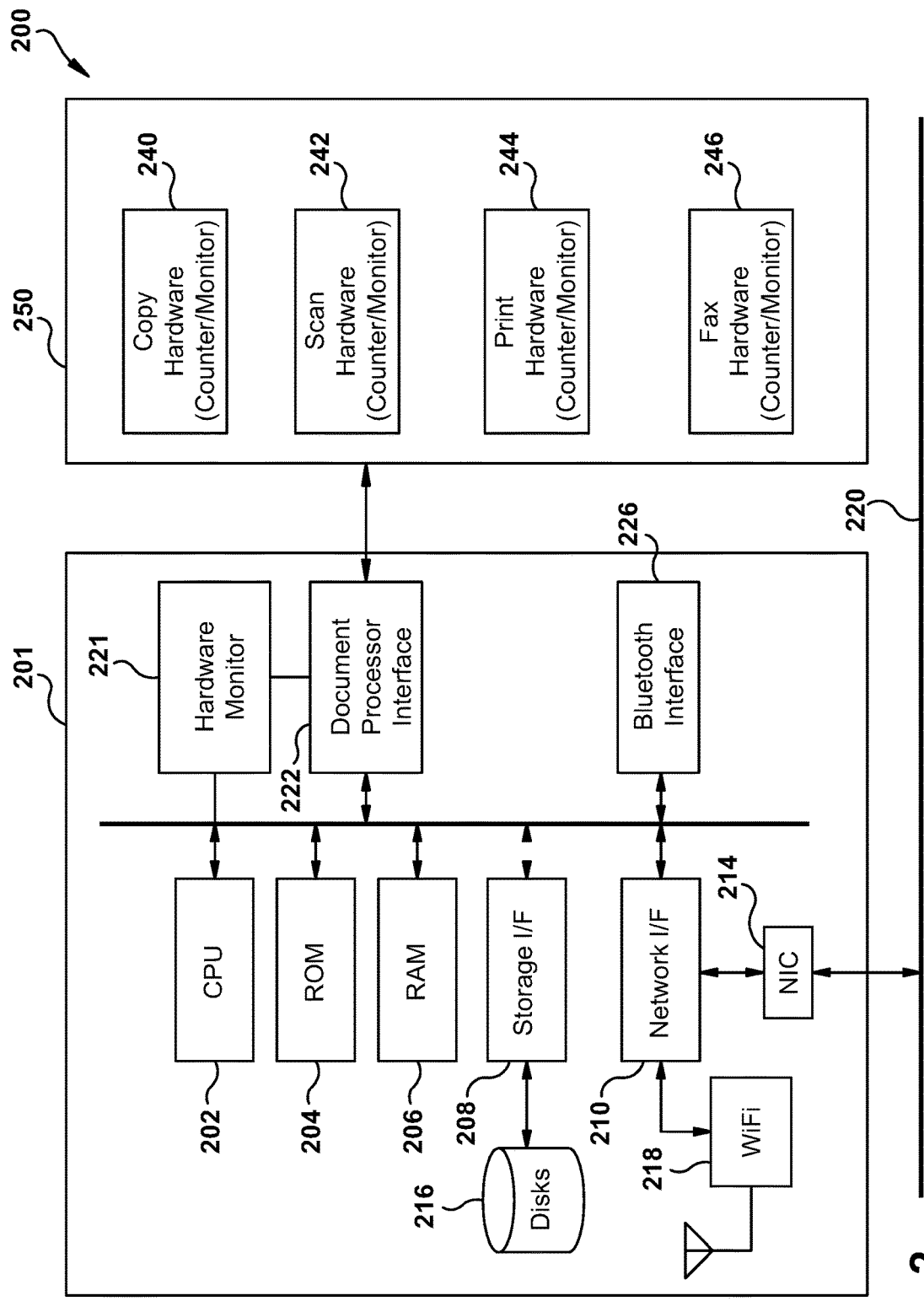
FIG. 2 is an example embodiment of a document rendering system.

Turning now to FIG. 2, illustrated is an example embodiment of a document rendering system 200 suitably comprised within an MFP, such as with MFPs 110 and 114 of FIG. 1. Included is controller 201 comprised of one or more processors, such as that illustrated by processor 202. Each processor is suitably associated with non-volatile memory such as ROM 204, and random access memory (RAM) 206, via a data bus.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, BLUETOOTH 226, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
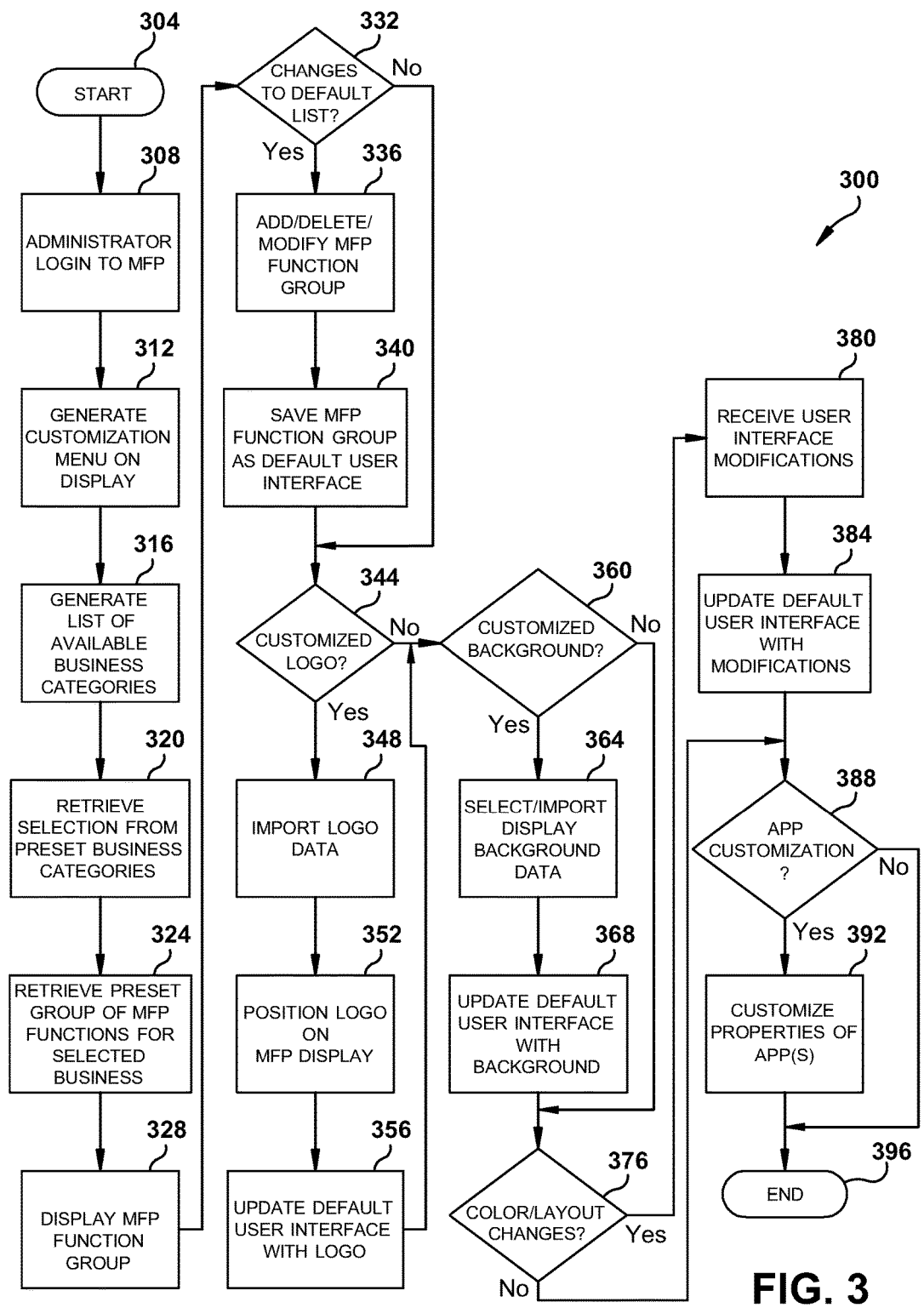
FIG. 3 is a flowchart of an example embodiment for providing a business customizable MFP.

FIG. 3 illustrates a flowchart 300 of an example embodiment for providing a business customizable MFP. The process commences at block 304 and proceeds to block 308 wherein an administrator suitably logs into the MFP, either on the MFP user interface or via a remote terminal. A customization menu is generated and displayed to the administrator at block 312 and a list of available business categories is generated and displayed at block 316. The administrator's selection of an available category is received at block 320. Next, a group of preset MFP functions, suitably comprised of applications that can be individually selected or selected in groups, is retrieved from storage at block 324 and displayed to the administrator at block 328. Functions may be retrieved that have been preselected to be associated with a business category or type previously selected by the administrator. If a change is to be made as determined at block 332, then the administrator's changes are made at block 336, saved to the default user interface at block 340, and a check is made at block 344 if a customized logo is to be added for displaying on the MFP user interface. If no changes to the function list are determined at block 332, progress goes directly to the logo change check of block 344.

If the administrator chooses to add a logo at block 344, then logo data is imported into the MFP at block 348 by physical media, wireless connection, wired connection or via a network connection. The administrator positions the logo on a display screen or screens at block 352 and the MFPs default user interface is updated accordingly at block 356. A check is then made at block 360 to determine whether a customized background is to be used. Progress to block 360 is direct from block 344 if no customized logo is to be used.

If a customized background is selected at block 360, then it is set at block 364 using either already available options on the MFP or imported background data. The default user interface is updated accordingly at block 368 and then a determination as to whether any changes to the MFP user interface color or layout is made at block 376. Progress is made directly from block 360 to block 376 if no changes to the MFP user interface background are selected.

If color or layout changes are selected in block 376, then the modifications are received at block 380 and the default user interface is stored accordingly at block 384. Next a check as to whether application customization is to be made is completed at block 388. If no color or layout changes were determined at block 376, progress is directly to block 388 for the check for customized applications. If customized applications are to be made, this is accomplished at block 392 and the process ends at block 396. If no application customization is determined at block 388, the process ends thereafter at block 396.

Turning now to FIG. 4, illustrated is a screenshot 400 of an example embodiment for administrative customization of applications. In this example, the administrator can configure application settings, such as scan quality at 404, color mode at 408, output file type at 412, page scanning at 416 and finishing at 420. The administrator may choose whether a scan confirmation is to be sent at 424.

Figure 5:
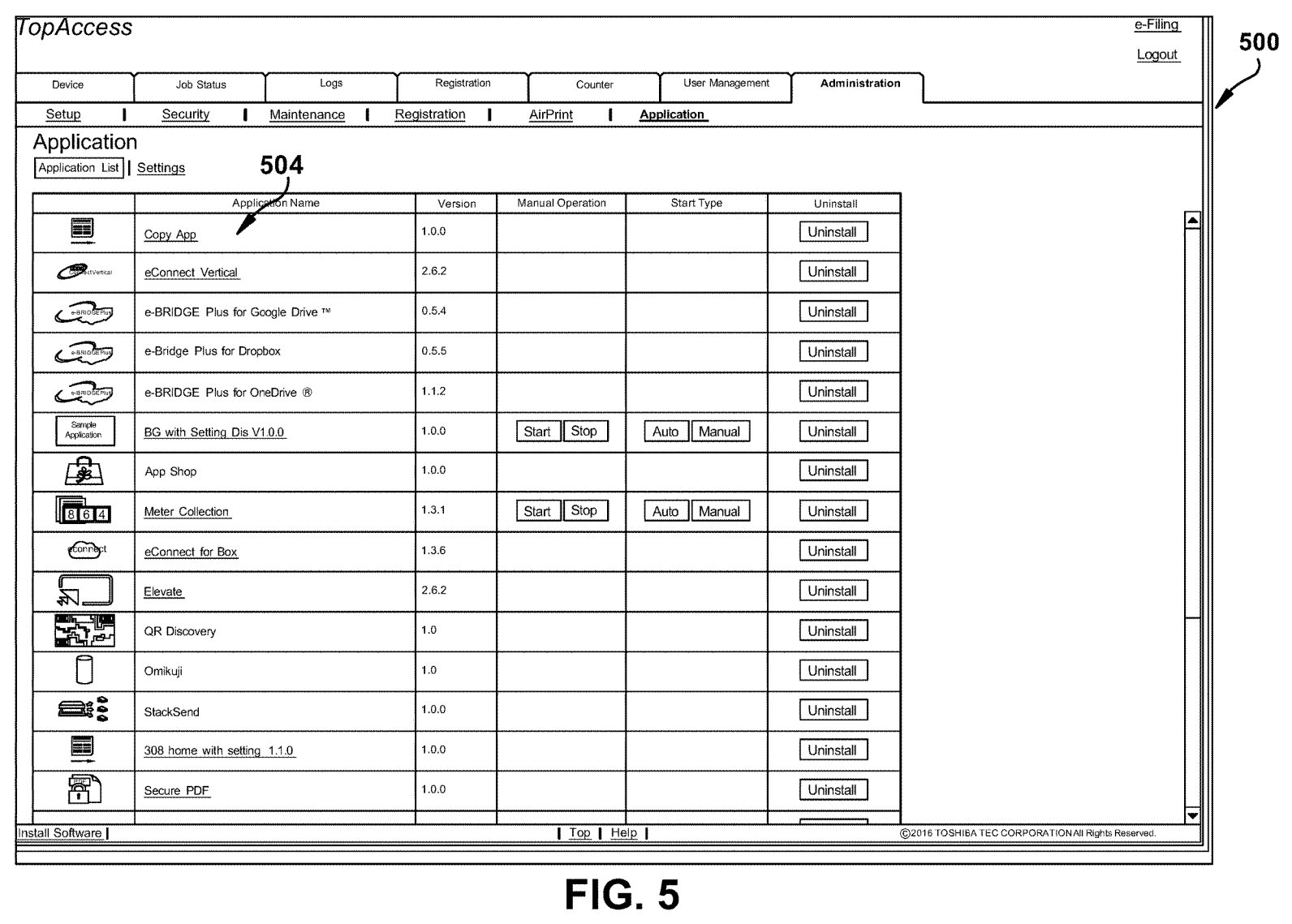

FIG. 5 illustrates a screenshot 500 of an example embodiment for administrative customization of applications. In the illustrated example, a list of available applications appears at 504, which applications can be installed/uninstalled or modified.

Figure 6:
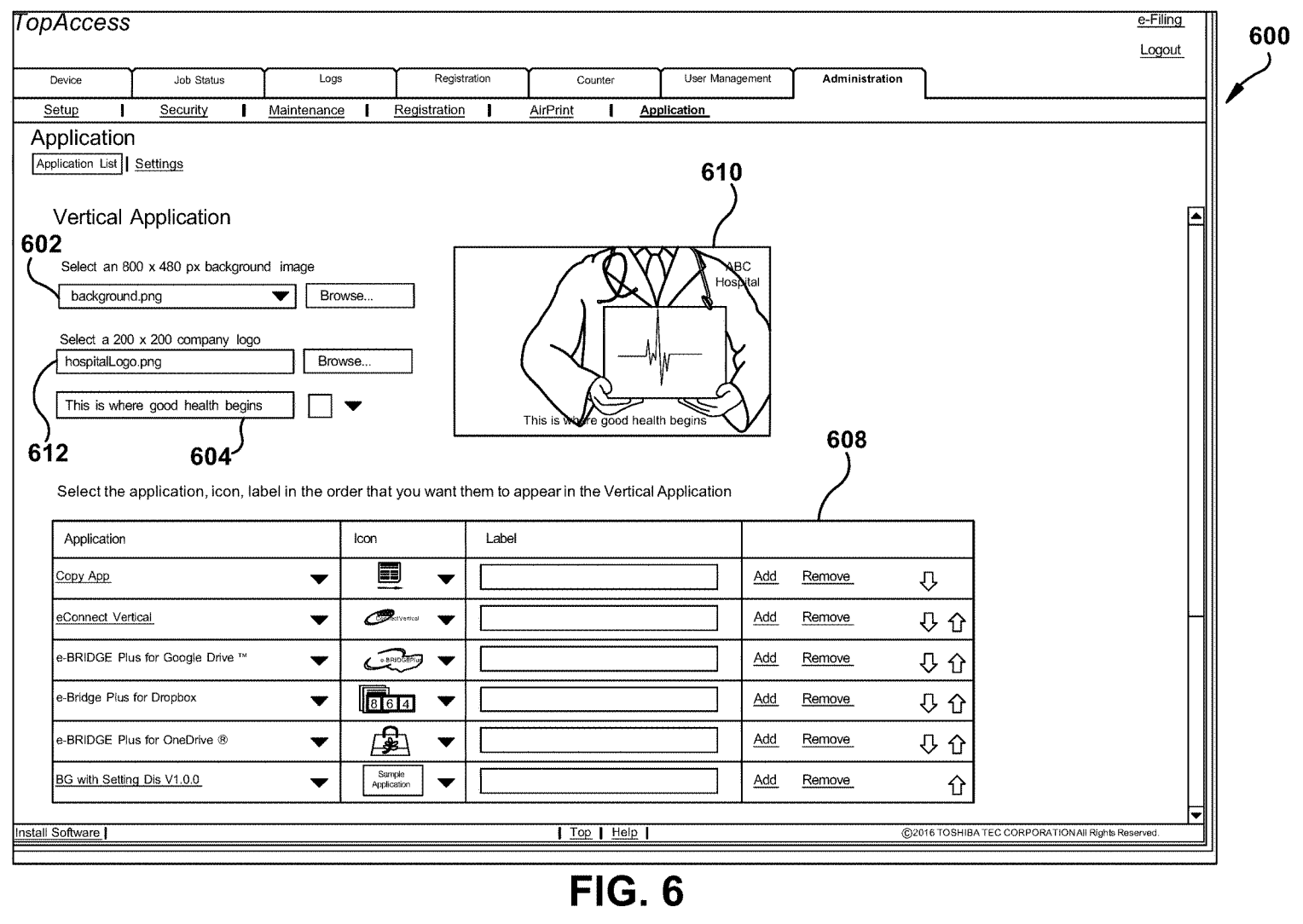

FIG. 6 illustrates a screenshot 600 of an example embodiment for further administrative customization. The vertical application (or UI Customization) is designed to contain one or many installed apps. Additionally, the UI is configurable by the administrator. Customizations suitably can include selections from a set of pre-stored background images or an uploaded background image at 602, add a tag line and select a font color at 604, select among the available (installed) applications and change their order or positions of appearance or add an application tag label at 608, or add a company logo at 612. A preview 610 of the customization can be presented to the user.

Figure 7:
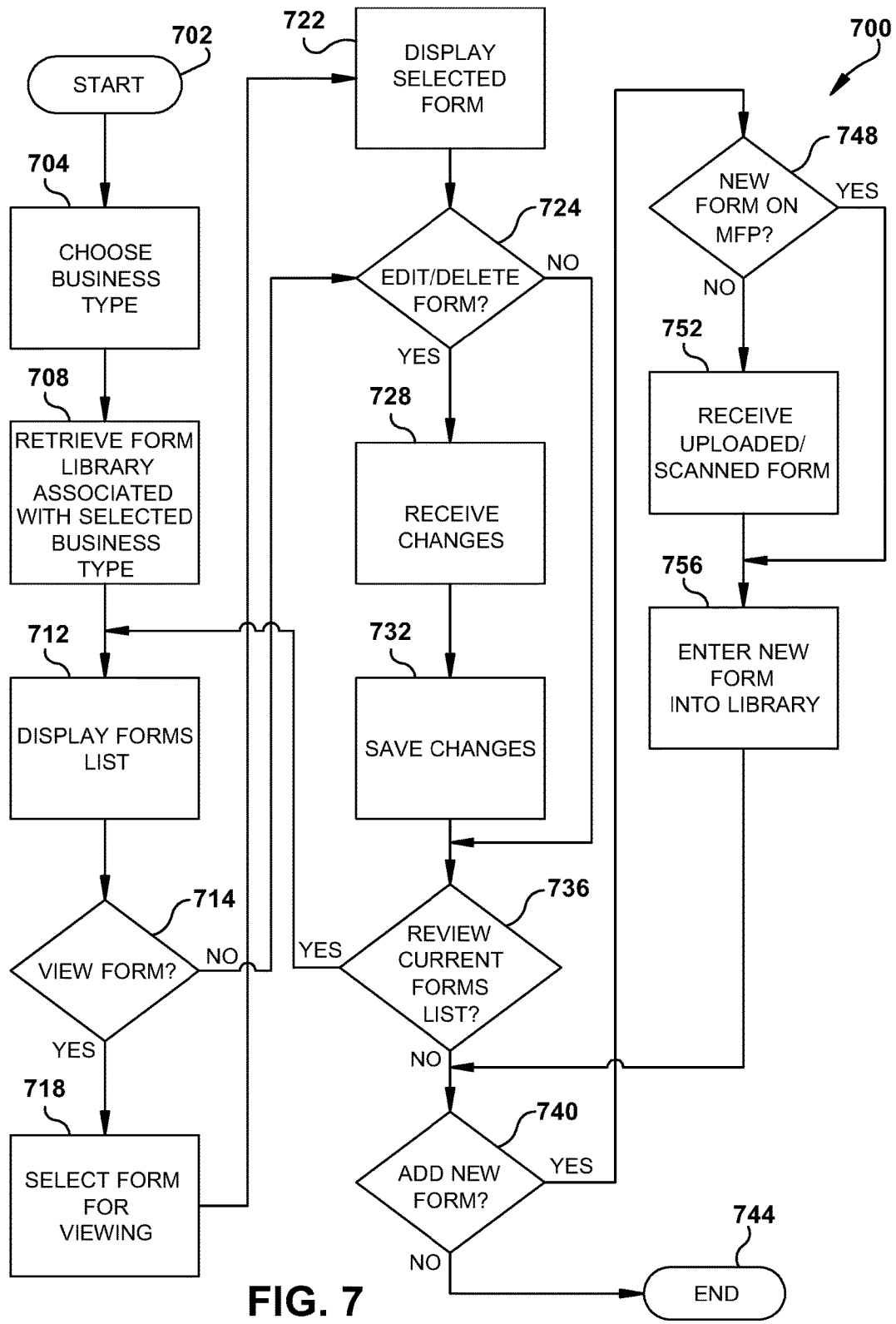
FIG. 7 is a flowchart of an example embodiment of MFP customization relative to available forms.

Referring next to FIG. 7, illustrated is a flowchart 700 of an example embodiment for MFP customization relative to available forms. The process starts at block 702 and proceeds to block 704 wherein a business type is selected from available options by an administrator. A form library associated with a selected business type is retrieved at block 708 and a listing of forms displayed at block 712. The administrator chooses whether to view a form at block 714. If so, the administrator selects a form for viewing at block 718 and the selected form is displayed at block 722. The administrator chooses whether to delete or edit the form at block 724. If no form is selected for viewing at block 714, the process progresses directly to block 724.

If the administrator chooses to edit or delete a form at block 724, changes are received at block 728 and saved at block 732 and the process progresses to block 736. If the administrator did not choose to edit or delete a form at block 724, the process progresses directly to block 736. If the administrator wishes to review the list again at block 736, the process returns to block 712. If not, the administrator chooses whether a new form is desired at block 740. If no new form is needed, the process terminates at block 744. If so, a check is made at block 748 as to whether the new form exists on the MFP, such as a form associated with another business library. If not, the new form is either uploaded digitally or scanned on the MFP scanner at block 752. If the new form is available on the MFP, or if the new form has been uploaded or scanned, the new form is entered into the default library at block 756 and the process returns to block 740 to determine if any other new forms are desired.

User interface customization is an effective way to improve MFP usability with rich customization options. Modifications are suitably made from a legacy user interface to one or more customized integrations. A user interface configuration may be desired that comprises more than one layout, template or theme. There are two basic methods for interface customization. A first is by using built-in customization functions such as that detailed above. Customizations include changing a home screen (background images, image icons, addition of company logo, such as one uploaded or tied to a web address), as well as phone numbers, set starting screen, templates, and the like. A second, and substantially more difficult and time consuming method, is to customize a user interface by modifying source code itself.

An MFP, particularly a customized MFP, can only have one user interface installed. If a user wants to use a different user interface, they need to uninstall the old interface and install a new one. There may be problems with attempting to use multiple user interfaces alternatively or at the same time. By way of particular example, if a device's firmware has been updated, one or more alternative user interfaces may not work correctly.

In further example embodiments, a user is able to install and select one or more user interfaces on an MFP. If multiple interfaces are selected, the MFP will combine all the selected interfaces into a common one. Detection is made as to whether firmware has been updated. If so, the MFP can update interface code automatically to make it work. If one or more interfaces remain problematic, the MFP allows the user to revert to an interface from a previous point in time to recover from MFP malfunctions or other problems.

Figure 8:
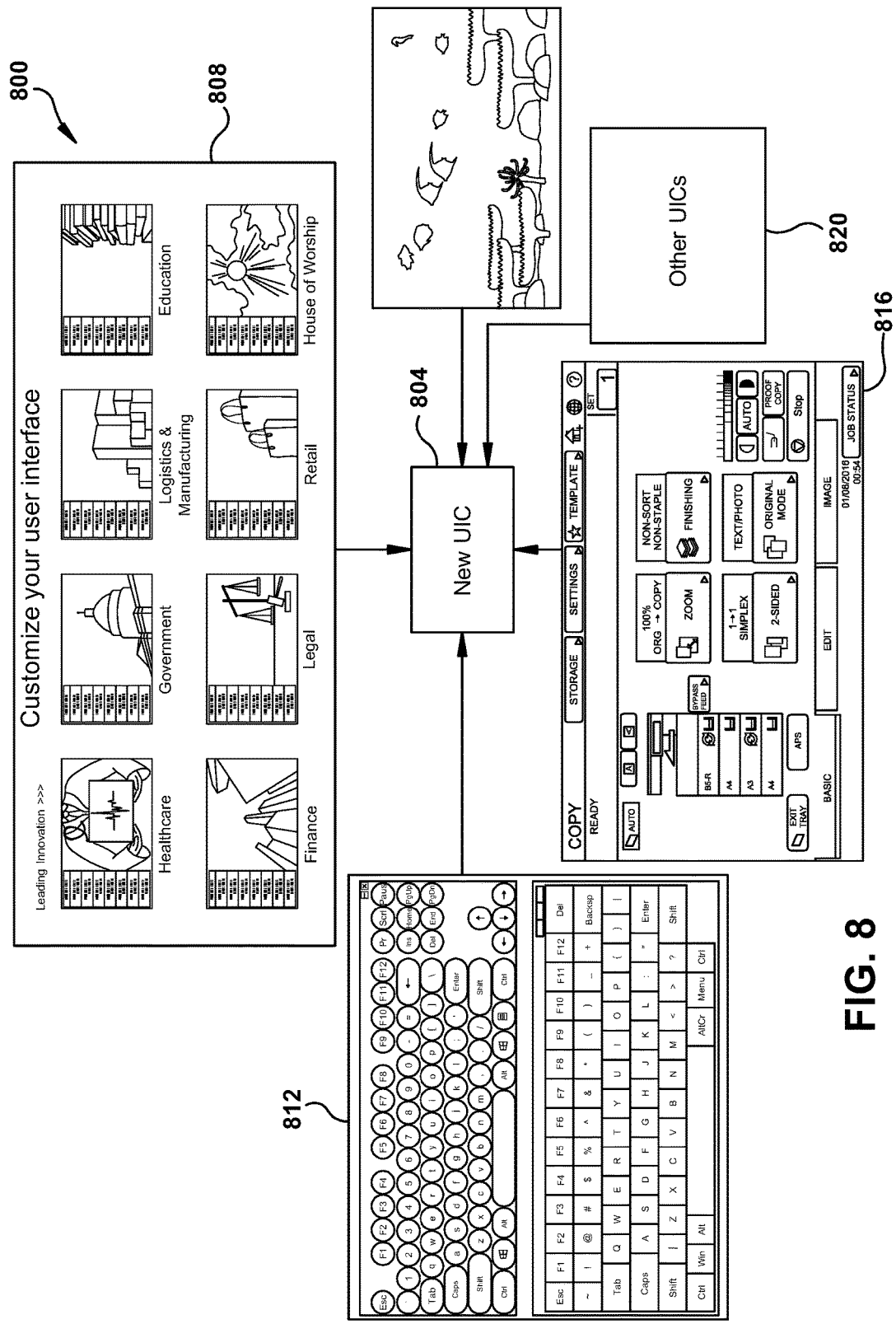
FIG. 8 is an example embodiment of device interface customization.

FIG. 8 illustrates an example embodiment of user interface customization 800. A new user interface customization 804 is suitably formed. Customization may include selection of a background from background selection options 808. Further customization may include selection from a set of touch input templates 812, touchscreen icons 816, or any other suitable user interface selection 820 which may include selections such as forms, document destinations, or the like.

Figure 9:
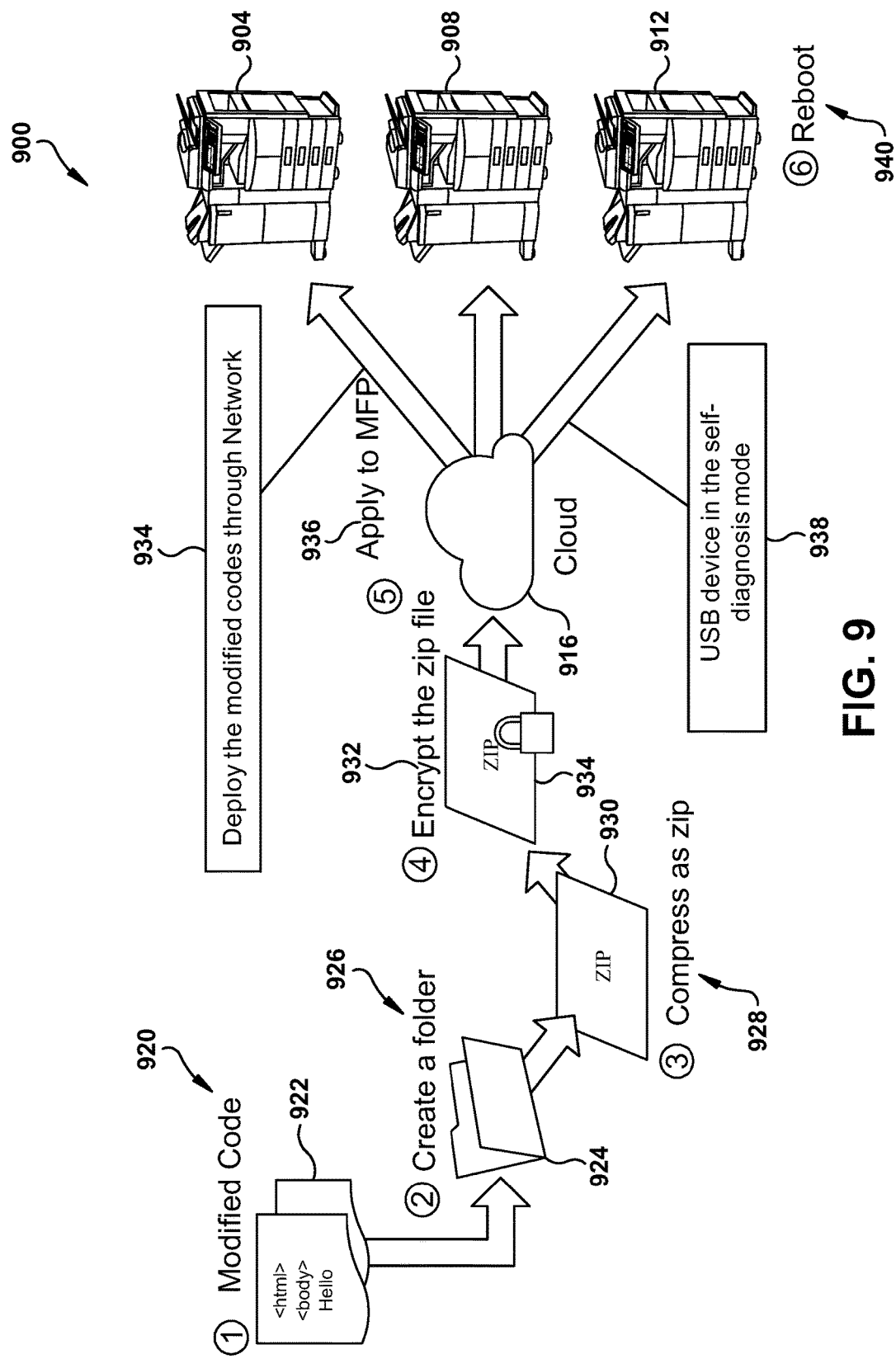
FIG. 9 is another example embodiment of device interface customization system.

FIG. 9 illustrates an example embodiment of a device interface customization system 900 for one or MFPs, such as MFPs 904, 908 and 912 in data communication with a network cloud 916. The process commences at 920 wherein user interface code 922 is modified. File folder 924 is created at 926, and modified code is copied to the file folder 924 for distribution. Next, at 928, the file folder containing the coded is compressed into a compressed file, such as zip file 930. The compressed file is encrypted at 932 to an encrypted, compressed zip file 934. The encrypted, compressed zipped file 934 is distributed and applied to MFPs 904, 908 and 912 at 936 via any suitable means, such as via network distribution 934 or by physical media, such as USB distribution 938. Each MFP is suitably rebooted at 940 to complete installation of the new user interface.

Figure 10:
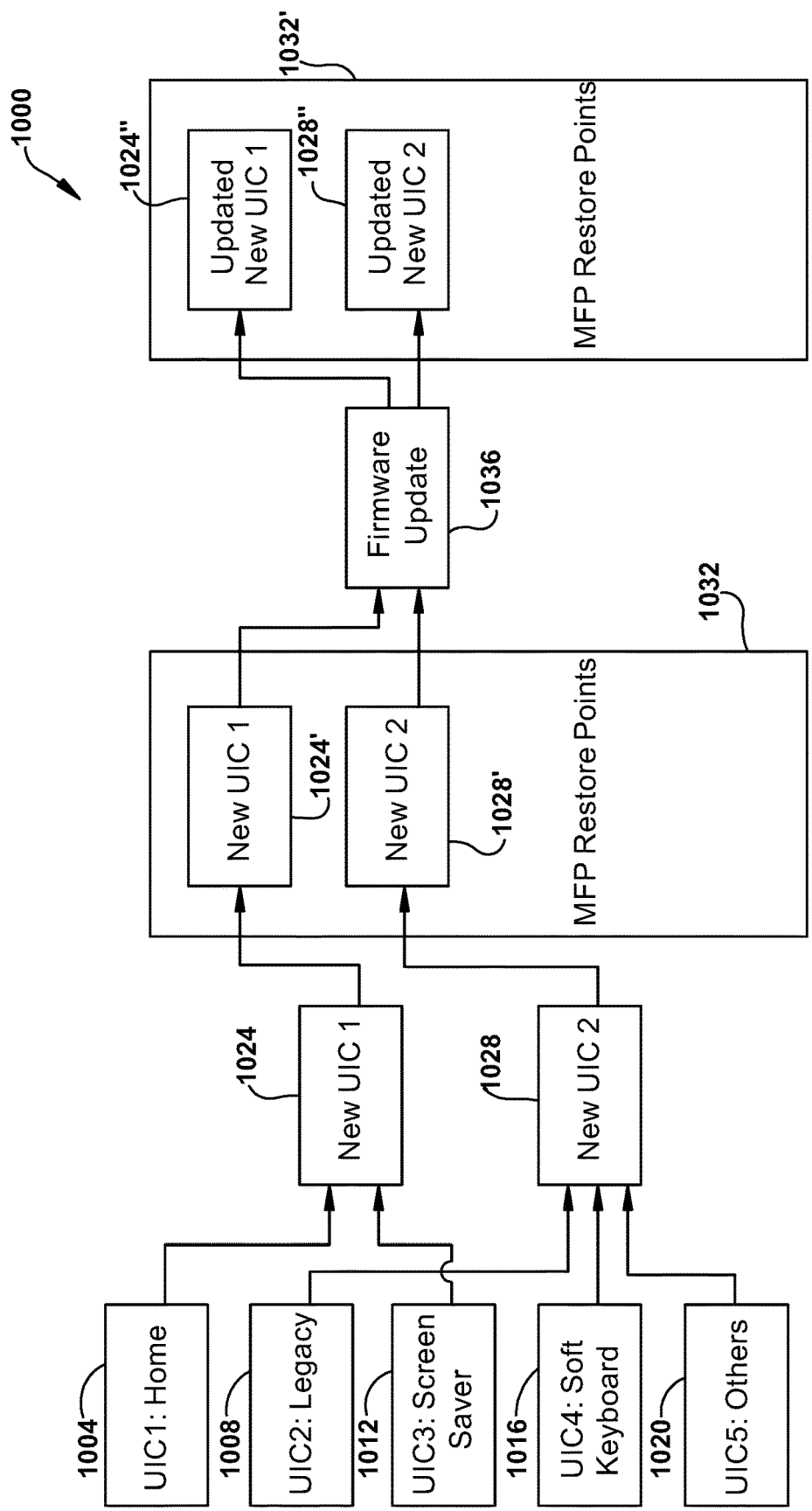
FIG. 10 is an example embodiment of a system for creating and implementing new, customized user interfaces.

FIG. 10 illustrates an example embodiment of system 1000 for creating and implementing new, customized user interfaces. In the illustrated example, user interface customization 1004 is a home screen, customization 1008 is a legacy interface, customization 1012 is a screen saver and customization 1016 is a soft keyboard. One or more other suitable customized interface 1020 is also provided. A new user interface customization 1024 is generated from a combination of interfaces 1004 and 1012. Another new user interface customization 1028 is generated from a combination of interfaces 1008, 1016 and 1020. The new user interfaces are associated with MFP restore points 1032 as illustrated by 1024' and 1028'. A firmware update is completed at 1036 and user interfaces 1024 and 1028 are updated as needed to 1024" and 1028", and suitably stored associatively with restore points 1032' for use if needed.

Figure 11:
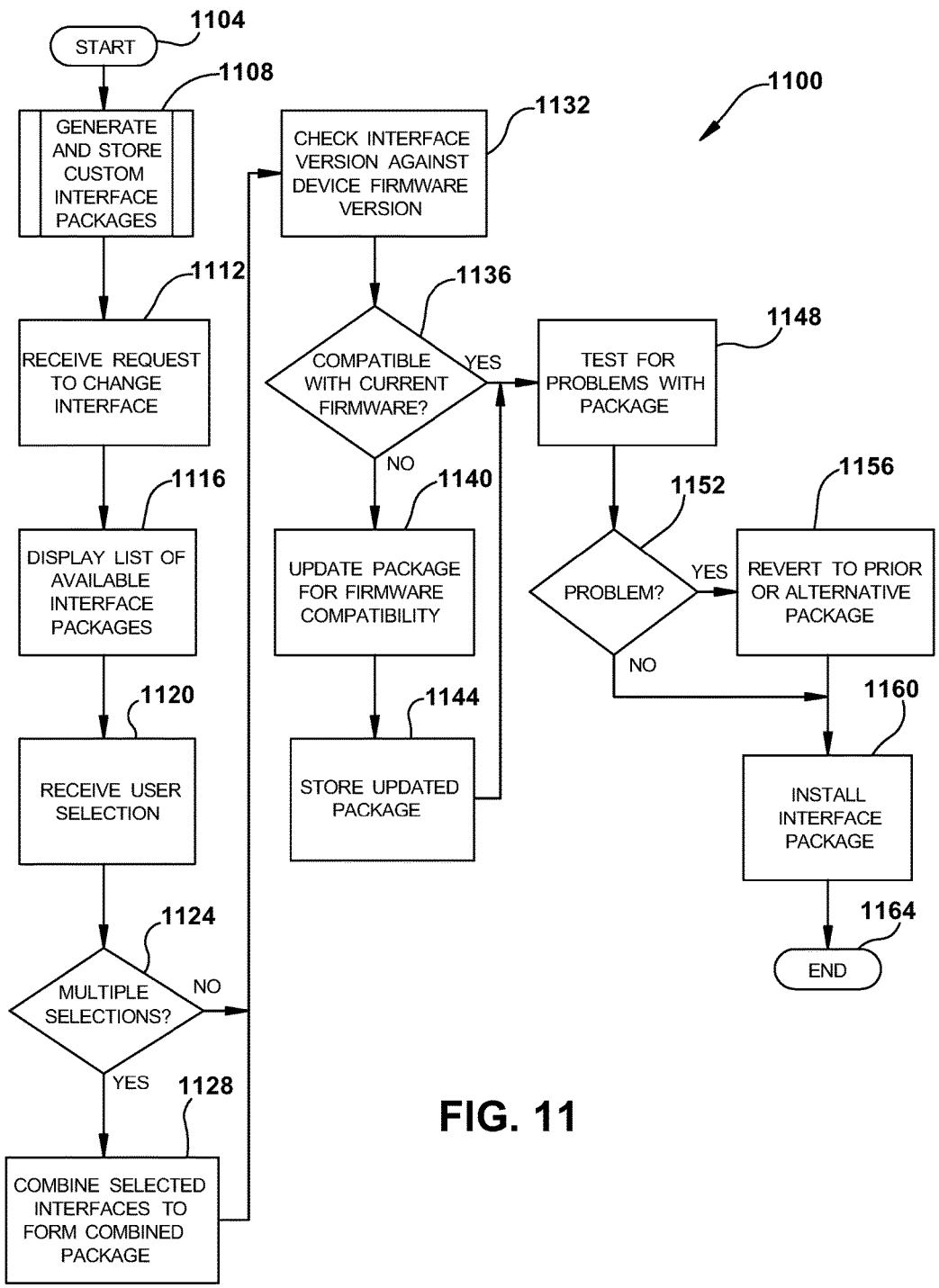
FIG. 11 is a flowchart of an example embodiment of user interface customization.

FIG. 11 is a flowchart 1100 of an example embodiment for user interface customization. The process commences at block 1104 and proceeds to block 1108 wherein one or more custom user interfaces are generated and stored. A request is received at block 1112 to change a user interface and a display of available interface options is generated at block 1116. A user selection of one or more interfaces is received at block 1120. If it is determined at block 1124 that multiple interfaces have been selected, they are combined at block 1128 and the interface is checked at block 1132 relative to a device firmware version. If it is determined that only a single interface was selected at block 1124, the process proceeds directly to block 1132.

Next, a check is made at block 1136 for firmware compatibility. If incompatibility is determined, the interface package is updated at block 1140 and the updated package stored at block 1144 before testing for problems at block 1148. If the package was determined to be compatible with the firmware at block 1136, the process proceeds directly to block 1148. Next, a check for problems is made at block 1152, and if a problem is detected, the system suitably reverts to a previous or prior alternative interface at block 1156, which interface is installed at block 1160 before the process ends at block 1164. If no problem is found at block 1152, the process proceeds directly to block 1160 and the process ends at block 1164.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   a document processing controller including,
      a processor, and
      a memory configured to
         store a plurality of identified electronic customization groups, each customization group including a plurality of electronic files, and
         store a plurality of device customization data sets, each data set corresponding to document processing in the multifunction peripheral;
   a print engine operational by instructions issued from the controller;
   a scanner engine operational by instructions issued from the controller;
   a user input; and
   a display,
   wherein the processor is configured to generate indicia on the display identifying each of the plurality of customization groups,
   wherein the processor is further configured to receive user selection data received via the user input corresponding to a selected identified customization group selected from the indicia,
   wherein the processor is further configured to generate, on the display, a customizations menu listing available customizations from the selected identified customization group,
   wherein the processor is further configured to generate, on the display, a document processing options menu including document processing options corresponding to a portion of the device customization data sets associated with the selected identified customization group, wherein the processor is further configured to store, in the memory, a plurality of selectable user interface packages, and
   wherein at least one of the interface packages is comprised of the document processing options menu.

2. The multifunction peripheral of claim 1 wherein the processor is further configured to generate indicia corresponding to each of the plurality of user interface packages on the display.

3. The multifunction peripheral of claim 2 wherein the processor is further configured to receive a user selection of a user interface package in accordance with a selection of corresponding indicia and implement a selected user interface package as a device user interface.

4. The multifunction peripheral of claim 3 wherein the processor is further configured to:
   detect a firmware change relative to firmware version associated with a selected user interface package, and
   update the selected user interface package to be compatible with a current device firmware package.

5. The multifunction peripheral of claim 3 wherein the processor is further configured to selectively revert to an alternative device user interface when the implemented device user interface is problematic.

6. The multifunction peripheral of claim 2 wherein the processor is further configured to:
   receive a selection of multiple user interface packages in accordance with selection of corresponding indicia,
   generate a hybrid user interface package in accordance with each selected user interface package, and
   implement the hybrid user interface package as the device user interface.

7. The multifunction peripheral of claim 6 wherein the processor is further configured to:
   detect a firmware change relative to firmware version associated with each selected user interface package, and
   update the hybrid user interface package to be compatible with a current device firmware package.

8. A method comprising:
   storing, in a memory, a plurality of identified electronic customization groups, each customization group including a plurality of electronic customization documents;
   storing a plurality of device customization data sets, each data set corresponding to control of a document processing operation of a multifunction peripheral;
   generating, via a processor, indicia on a display identifying each of the plurality of customization groups;
   receiving user selection data corresponding to a selected identified customization group selected from the indicia;
   generating, on the display, a customizations menu listing available customizations from the selected identified customization group;
   generating, on the display, a document processing options menu including document processing options corresponding to a portion of the device customization data construction sets associated with the selected identified customization group;
   storing, in the memory, a user interface package comprising the document processing options menu; and
   storing, in the memory, a plurality of selectable user interface packages, wherein at least one of the interface packages is comprised of the document processing options menu.

9. The method of claim 8 further comprising generating indicia corresponding to each of the plurality of user interface packages on the display.

10. The method of claim 9 further comprising receiving a user selection of a user interface packages in accordance with a selection of corresponding indicia and implement a selected user interface package as a device user interface.

11. The method of claim 10 further comprising:
    detecting a firmware change relative to firmware version associated with a selected user interface package; and
    updating the selected user interface package to be compatible with a current device firmware package.

12. The method of claim 10 further comprising selectively reverting to a prior device user interface when the implemented device user interface is problematic.

13. The method of claim 9 further comprising:
    receiving a selection of multiple user interface packages in accordance with selection of corresponding indicia;
    generating a hybrid user interface package in accordance with each selected user interface package; and
    implementing the hybrid user interface package as the device user interface.

14. The method of claim 13 further comprising:
    detecting a firmware change relative to firmware version associated with each selected user interface package; and
    updating the hybrid user interface package to be compatible with a current device firmware package.

15. A multifunction peripheral comprising:
    a touchscreen user interface; and
    a document processing controller including, a memory configured to store a plurality of user interface packages, wherein at least one stored interface package includes a user customized menu created by an associated user on the multifunction peripheral for control of appearance and functionality of the touchscreen, and a processor configured to generate indicia corresponding to each of the plurality of user interface packages on the touchscreen, receive a user selection of a user interface package in accordance with a selection of corresponding indicia from the touchscreen, and implement a selected user interface package as a device user interface on the touchscreen.

16. The multifunction peripheral of claim 15 wherein the processor is further configured to:

detect a firmware change relative to firmware version associated with a selected user interface package, and update the selected user interface package to be compatible with a current device firmware package.

17. The multifunction peripheral of claim 15 wherein the processor is further configured to:

receive a selection of multiple user interface packages in accordance with selection of corresponding indicia, generate a hybrid user interface package in accordance with each selected user interface package, and implement the hybrid user interface package on the touchscreen as the device user interface.

18. The multifunction peripheral of claim 17 wherein the processor is further configured to:

detect a firmware change relative to firmware version associated with each selected user interface package, and update the hybrid user interface package to be compatible with a current device firmware package.

19. The multifunction peripheral of claim 15 wherein the processor is further configured to test functionality of the selected user interface package.

20. The multifunction peripheral of claim 19 wherein the processor is further configured to revert to an alternative device user interface when the implemented device user interface is problematic.

* * * * *